(12) United States Patent
Tokimitsu et al.

(10) Patent No.: US 8,797,542 B2
(45) Date of Patent: Aug. 5, 2014

(54) MEASUREMENT APPARATUS

(75) Inventors: Takumi Tokimitsu, Moka (JP); Yoshiyuki Kuramoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 387 days.

(21) Appl. No.: 13/292,192

(22) Filed: Nov. 9, 2011

(65) Prior Publication Data

US 2012/0113434 A1    May 10, 2012

(30) Foreign Application Priority Data

Nov. 9, 2010 (JP) ................................. 2010-251278

(51) Int. Cl.
*G01B 9/02* (2006.01)

(52) U.S. Cl.
USPC .......................................... 356/486

(58) Field of Classification Search
CPC ............... G01B 11/02; G01B 9/02027; G01B 9/02084; G01J 9/02
USPC .......................... 356/484, 486, 498
See application file for complete search history.

(56) References Cited

U.S. PATENT DOCUMENTS

| | | | | |
|---|---|---|---|---|
| 7,307,700 B1 * | 12/2007 | Leep et al. | ..................... | 356/5.15 |
| 8,502,986 B2 * | 8/2013 | Koda et al. | ..................... | 356/486 |
| 2013/0070256 A1 * | 3/2013 | Tokimitsu | ..................... | 356/498 |

FOREIGN PATENT DOCUMENTS

JP    2725434 B    3/1998

OTHER PUBLICATIONS

Young Kim, et al., "Phase-slope and group dispersion calculations in the frequency domain by simple optical low-coherence refecltometry", Dec. 1, 2003, Applied Optics, vol. 42 No. 34, pp. 6959-6966.*
English Translation of Chih-Che Kuo et al. "Signal Processing for Wavelength Scanning Interferometer" vol. 69, No. 6, 2003, University of Tokyo, 7-3-1 Hongo, Bunkyo-ku, Tokyo.

* cited by examiner

*Primary Examiner* — Jonathan Hansen
(74) *Attorney, Agent, or Firm* — Rossi, Kimms & McDowell LLP

(57) ABSTRACT

A measurement apparatus which measures a distance between a reference surface and a test surface, comprises a light source unit including a plurality of light sources each corresponding to one of a plurality of wavelength scanning ranges and each continuously scans a wavelength of generated light in the corresponding wavelength scanning range, an interferometer unit which splits light emitted by each of the plurality of light sources into reference light and test light, and detects, as an interference signal, an interference fringe formed by the reference light and the test light, and a processor which determines a slope of a phase of the interference signal with respect to wave number of the light based on the interference signal detected by the interferometer unit for each of the plurality of wavelength scanning ranges, and determines the distance from the slope of the phase.

7 Claims, 7 Drawing Sheets

F I G. 4A
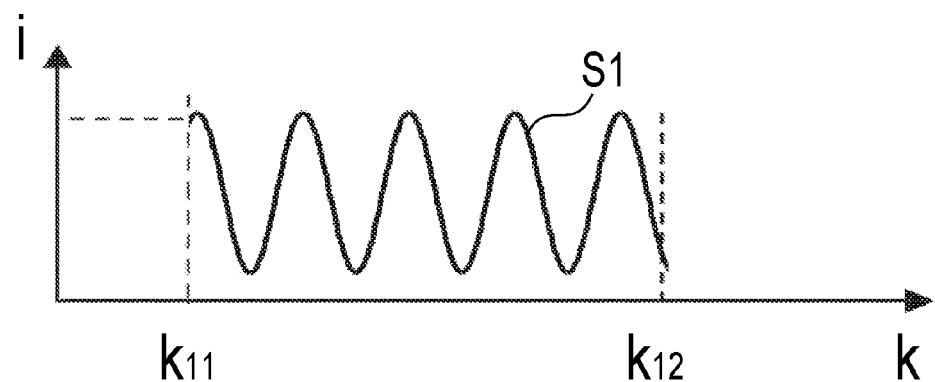
F I G. 4B
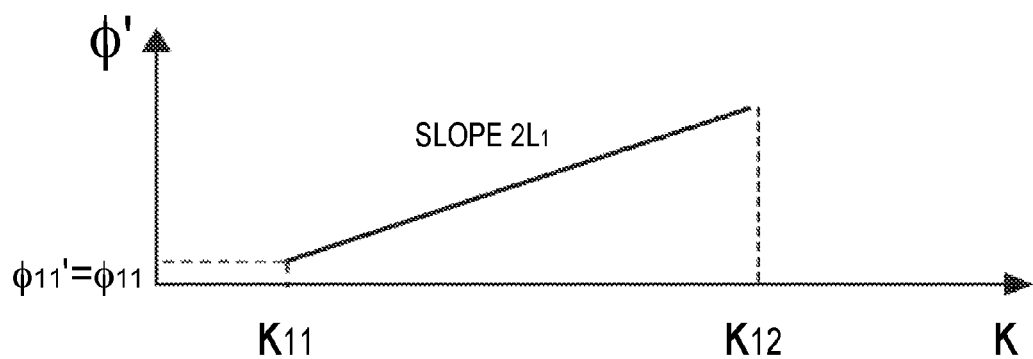

MEASUREMENT APPARATUS

BACKGROUND OF THE INVENTION

1. Field of the Invention

The present invention relates to a measurement apparatus which measures the distance between a reference surface and a test surface.

2. Description of the Related Art

A wavelength scanning interferometer is known as a measurement apparatus which measures the distance between a reference surface and a test object. The wavelength scanning interferometer obtains the distance between a reference surface and a test object based on a temporal change of the intensity or phase of interference light caused by temporally scanning the wavelength of light emitted by a light source. The measurement accuracy of the wavelength scanning interferometer increases for a larger wavelength scanning range. The maximum measurement range depends on the coherence length of light emitted by a light source. To measure a long distance, a single mode laser is preferably used to generate light with a long coherence length.

Literature 1 (KUO Chih-Che et. al., "Signal Processing for Wavelength Scanning Interferometer", Journal of the Japan Society for Precision Engineering, The Japan Society for Precision Engineering, Vol. 69, No. 6, p. 831, 2003) reports a wavelength scanning interferometer which obtains a distance by scanning the wavelength at a width of about 100 nm, performing FFT processing for the intensity of interference light at each wavelength, and detecting the peak of a modulated frequency. In literature 1, a measurement range of 1.56 mm can be measured at a resolution of 0.06 µm by improving the peak detection accuracy after FFT to 1/100 of the FFT pitch by interpolation or the like.

An FM heterodyne method, which is one of measurement methods for the wavelength scanning interferometer, measures the intensity of an interference signal at a fixed wavelength, and calculates a distance from a change of the intensity of the interference signal caused by wavelength scanning. For example, literature 2 (Japanese Patent No. 2725434) discloses a technique of guaranteeing the scanning amount of the wavelength using a reference interferometer (that is, using the length of the reference interferometer as a reference), and guaranteeing a fixed wavelength using a wavelength reference such as an etalon or gas cell in the FM heterodyne method.

However, when the wavelength scanning interferometer tries to obtain a desired measurement accuracy, measurement range, and measurement speed, it needs to use a light source which simultaneously satisfies a desired wavelength scanning range, coherence length, and wavelength scanning speed. This greatly restricts selection of a light source in the arrangement of the wavelength scanning interferometer.

The wavelength scanning interferometer reported in literature 1 obtains high measurement accuracy because of a wide wavelength scanning range of 100 nm. However, the measurement range is as narrow as about 1.6 mm owing to a short coherence length of the light source.

Some external cavity semiconductor lasers are known to oscillate in the single mode and have a long coherence length. When a wide wavelength scanning range is obtained, such a semiconductor laser cannot often achieve high-speed wavelength scanning and is expensive. Even an inexpensive distributed-feedback laser (DFB laser) can be used to obtain a wide wavelength scanning range by wavelength scanning based on temperature modulation. However, following takes time, so wavelength scanning cannot be done quickly. Wavelength scanning can be performed quickly by changing a current to be supplied to a vertical cavity surface emitting laser (VCSEL) or DFB laser. In this case, no wide wavelength scanning range can be obtained.

The technique disclosed in literature 2 needs to widen the wavelength scanning range to improve the accuracy, and the cost of the light source rises. This technique requires a reference interferometer, complicating the arrangement of the interferometer. In addition, the measurement accuracy decreases upon variations of the length of the reference interferometer serving as a reference.

SUMMARY OF THE INVENTION

The present invention provides a measurement apparatus that is advantageous for quickly measuring the distance between a reference surface and a test object with high accuracy by a simple arrangement.

One of the aspects of the present invention provides a measurement apparatus which measures a distance between a reference surface and a test surface, the apparatus comprising: a light source unit including a plurality of light sources each corresponding to one of a plurality of wavelength scanning ranges which are separate from each other and each continuously scans a wavelength of generated light in the corresponding wavelength scanning range of the plurality of wavelength scanning ranges; an interferometer unit which splits light emitted by each of the plurality of light sources into reference light and test light, and detects, as an interference signal, an interference fringe formed by the reference light reflected by the reference surface and the test light reflected by the test surface; and a processor which determines a slope of a phase of the interference signal with respect to wave number of the light based on the interference signal detected by the interferometer unit for each of the plurality of wavelength scanning ranges, and determines the distance from the slope of the phase, wherein the light source unit simultaneously scan the plurality of wavelength scanning ranges, and the interferometer unit simultaneously detects the interference fringes each formed by the light from the corresponding light source of the plurality of light sources, wherein the processor determines, based on a first interference signal detected by the interferometer unit for a first wavelength scanning range that is one of the plurality of wavelength scanning ranges, a first slope of a phase, that is a slope of a phase of the first interference signal with respect to wave number within the first wavelength scanning range, and a fractional component of a first phase that is a phase of the first interference signal at an arbitrary wave number falling within the first wavelength scanning range, determines, based on a second interference signal detected by the interferometer unit for a second wavelength scanning range that is another one of the plurality of wavelength scanning ranges, a fractional component of a second phase that is a phase of the second interference signal at an arbitrary wave number falling within the second wavelength scanning range, determines, based on the first slope of the phase, the fractional component of the first phase, and the fractional component of the second phase, a first interference-order-difference that is a difference between order of interference of the first phase and order of interference of the second phase, and determines, as an updated slope of a phase for determining the distance, based on the first interference-order-difference, the fractional component of the first phase, and the fractional component of the second phase, a second slope of a phase, that is a slope of a phase of an interference signal, containing the first interference signal and the second interference signal, with respect to wave number.

Further features of the present invention will become apparent from the following description of exemplary embodiments with reference to the attached drawings.

BRIEF DESCRIPTION OF THE DRAWINGS

FIGS. 4A and 4B are graphs exemplifying the interference signal S1 and its phase;

DESCRIPTION OF THE EMBODIMENTS

A wavelength scanning interferometer serving as a measurement apparatus according to an embodiment of the present invention can comprise a light source unit including N wavelength scanning light sources which scan wave numbers of light in N (N is an integer of 2 or more) wavelength scanning ranges (wave number scanning ranges) separate from each other. The wavelength scanning interferometer determines the distance between a reference surface and a test surface at high accuracy according to the following distance determination method based on an interference signal which is a detection signal of an interference fringe between reference light and test light in each wave number scanning range.

In the distance determination method, a fractional component $\phi_1$ of the phase of an interference signal at an arbitrary wave number $k_1$ falling within the first wave number scanning range, and a slope $2L_2$ of the phase of the interference signal with respect to the arbitrary wave number $k_1$ within the first wave number scanning range are obtained based on an interference signal detected within the first wave number scanning range. Further, a fractional component $\phi_2$ of the phase of an interference signal at an arbitrary wave number $k_2$ falling within the second wave number scanning range is obtained based on an interference signal detected within the second wave number scanning range. The difference between the order of interference of the interference signal at the wave number $k_1$ and the order of interference of the interference signal at the wave number $k_2$ is determined based on the slope $2L_1$ of the phase, thereby newly determining a slope $2L_2$ of the phase between the wave numbers $k_1$ and $k_2$. Similarly, a fractional component $\phi_i$ of the phase of an interference signal at an arbitrary wave number $k_i$ falling within the ith wave number scanning range is determined based on an interference signal within the ith wave number scanning range. Further, a slope $2L_{1(i-1)}$ of the phase is obtained based on up to the (i−1)th wave number range. The difference between the order of interference of the interference signal at the wave number $k_1$ and the order of interference of the interference signal at the wave number $k_i$ is determined based on the slope $2L_{1(i-1)}$ of the phase. A slope $2L_{1i}$ of the phase between the wave numbers $k_1$ and $k_i$ is determined as an updated slope of the phase. This method is repeated up to i=N, obtaining a final distance (absolute distance) $L_{1n}$.

Figure 1:
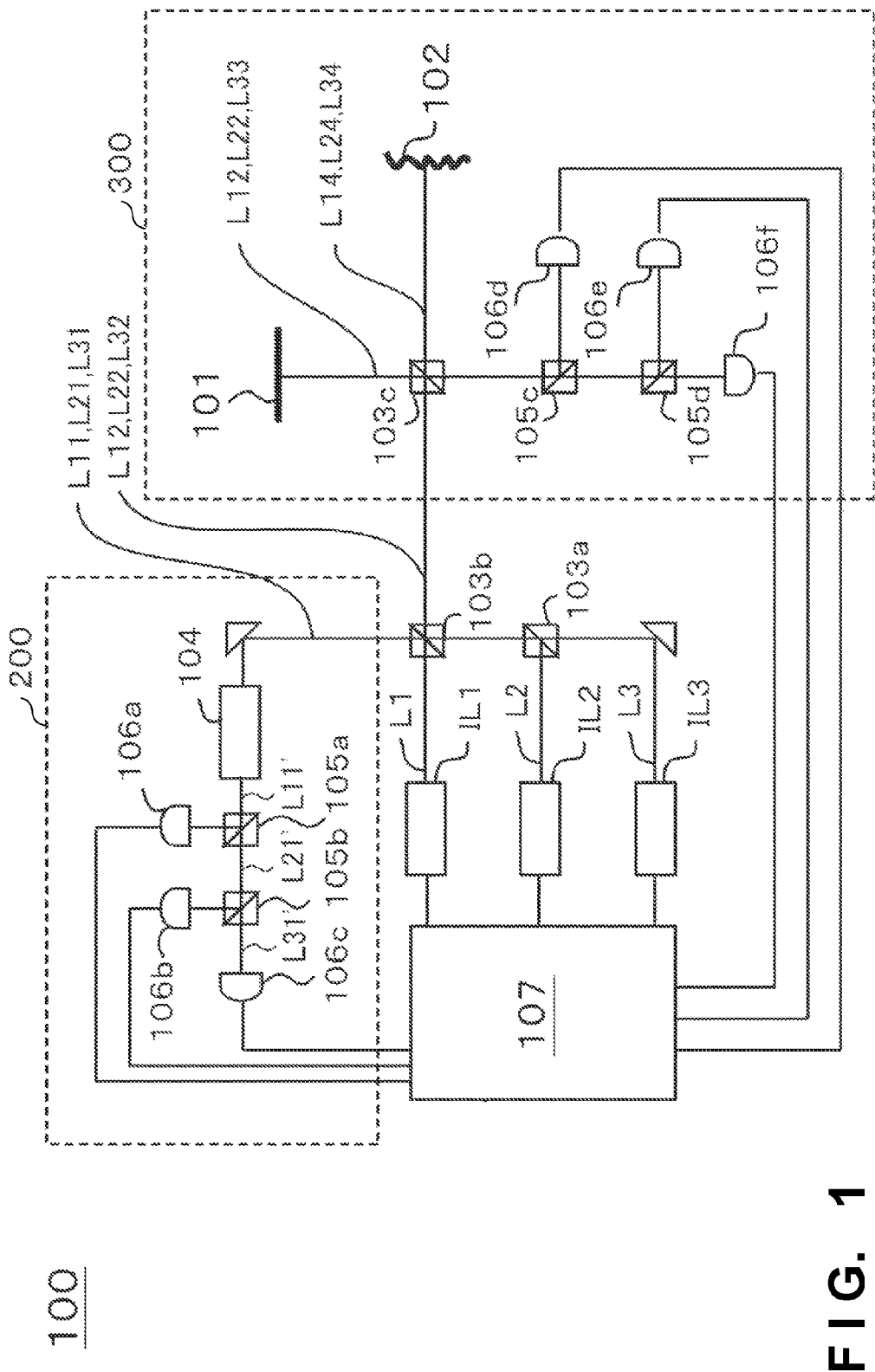
FIG. 1 is a view showing the schematic arrangement of a measurement apparatus (wavelength scanning interferometer) according to the first embodiment.

The arrangement of a measurement apparatus (wavelength scanning interferometer) 100 according to the first embodiment of the present invention will be described with reference to FIG. 1. The measurement apparatus 100 obtains the optical path length difference between a reference surface 101 and a test surface 102 as an absolute distance L. The measurement apparatus 100 includes a light source unit including three light sources IL1, IL2, and IL3 for scanning a plurality of (three in this case) wavelength scanning ranges separate from each other. The light sources IL1, IL2, and IL3 can be VCSELs. A processor 107 continuously changes the wavelength of light (in other words, the wave number of light) to be emitted from each of the light sources IL1, IL2, and IL3 by changing a current to be supplied to each of them. The light source IL1 scans the first wavelength scanning range of $\lambda_{11}$ to $\lambda_{12}$, the light source IL2 scans the second wavelength scanning range of $\lambda_{21}$ to $\lambda_{22}$, and the light source IL3 scans the third wavelength scanning range of $\lambda_{31}$ to $\lambda_{32}$, simultaneously. Assume that the respective wavelengths satisfy $\lambda_{11} > \lambda_{12}$, $\lambda_{21} > \lambda_{22}$, and $\lambda_{31} > \lambda_{32}$. Light beams L1, L2, and L3 emitted by the light sources IL1, IL2, and IL3 are merged by beam splitters 103a and 103b. The beam splitter 103b splits the merged light beams L1, L2, and L3 into light beams L11, L21, and L31 to be provided to a wave number measurement unit 200 and light beams L12, L22, and L32 to be provided to an interferometer unit 300.

The light beams L11, L21, and L31 which have entered the wave number measurement unit 200 pass through a Fabry-Perot etalon 104, and then separated into light beams L11', L21', and L31' by wavelength filters (spectral elements) 105a and 105b. The light beams L11', L21', and L31' enter detectors 106a, 106b, and 106c, respectively. The detectors 106a, 106b, and 106c detect the intensities of the light beams L11', L21', and L31' having passed through the Fabry-Perot etalon 104, and provide the detection results to the processor 107. Intensity data of the light beams L11', L21', and L31' detected by the detectors 106a, 106b, and 106c are data indicating temporal changes of the relative wave numbers of light beams emitted by the light sources IL1, IL2, and IL3. That is, the wave number measurement unit 200 provides the processor 107 with data (to be referred to as wave number measurement data) indicating temporal changes of the relative wave numbers of light beams emitted by the light sources IL1, IL2, and IL3.

As for the transmission spectrum of the Fabry-Perot etalon 104, the relative value of each wave number should be guaranteed. The Fabry-Perot etalon 104 can be a vacuum medium etalon with a guaranteed transmission spectrum interval. The vacuum medium etalon can easily guarantee the relative value of the wave number because there is neither the refractive index nor dispersion of the internal medium. When the etalon is made of a low thermal expansion glass or the like, the expansion coefficient for the temperature can be reduced to implement a wave number reference element which is stable for a long term. However, the Fabry-Perot etalon 104 is not limited to the vacuum medium etalon, and may be an air gap etalon or solid etalon. In this case, the internal refractive index and dispersion need to be guaranteed by, for example, measuring the temperature of the etalon. To guarantee a wave number at each time in wavelength scanning, the Fabry-Perot etalon 104 preferably has at least two transmission spectra within each of the wavelength scanning ranges of the light sources IL1, IL2, and IL3.

The light beams L12, L22, and L32 which have entered the interferometer unit 300 are split by a beam splitter 103c into reference light beams L13, L23, and L33 to be provided to the reference surface 101 and test light beams L14, L24, and L34 to be provided to the test surface 102. The beam splitter 103c merges the reference light beams L13, L23, and L33 reflected by the reference surface 101 and the test light beams L14, L24, and L34 backscattered by the test surface 102. Wavelength filters 105c and 105d split the merged light beam into a pair of the reference light beam L13 and test light beam L14, a pair of the reference light beam L23 and test light beam L24, and a pair of the reference light beam L33 and test light beam L34. These pairs enter detectors 106d, 106e, and 106f, respectively. The detector 106d detects, as a first interference signal S10, an interference fringe formed by the reference light beam L13 and test light beam L14. The detector 106e detects, as a second interference signal S20, an interference fringe formed by the reference light beam L23 and test light beam L24. The detector 106f detects, as a third interference signal S30, an interference fringe formed by the reference light beam L33 and test light beam L34. The interference signals S10, S20, and S30 are interference signals within the wavelength scanning ranges of light beams emitted by the light sources IL1, IL2, and IL3, respectively.

Based on wave number measurement data provided from the wave number measurement unit 200, the processor 107 converts the interference signals S10, S20, and S30 which change temporally, into a first interference signal S1, second interference signal S2, and third interference signal S3 which change along with changes of the wave number. The intensity of light emitted by the light source changes depending on the current, and this change is desirably corrected. The absolute distance between the reference surface 101 and the test surface 102 is calculated based on the thus-obtained interference signals S1, S2, and S3.

Figure 2:
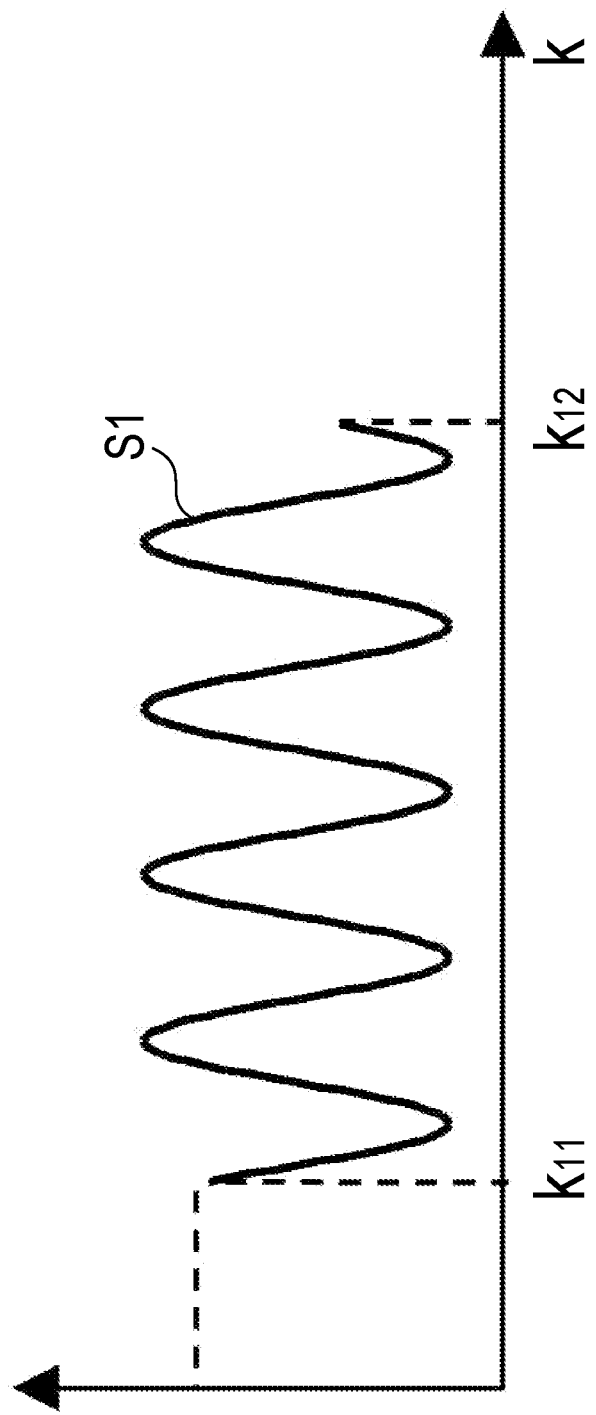
FIG. 2 is a graph exemplifying an interference signal S1.

A method of determining the absolute distance from the interference signals S1, S2, and S3 will be explained. First, a conventional method will be described. For descriptive convenience, a wave number k given by $k=2\pi/\lambda$ where $\lambda$ is the wavelength will be used. In an expression using the wave number k, the light source IL1 scans a wave number scanning range of $k_{11}$ $(=2\pi/\lambda_{11})$ to $k_{12}$ $(=2\pi/\lambda_{12})$. FIG. 2 exemplifies the intensity of the interference signal S1. FIG. 2 shows the interference signal S1 when the wave number k measured at each time by the wave number measurement unit 200 is plotted along the abscissa. The interference signal S1 is given by equation (1) for the wave number k:

$$S1(k) = A^2 + B^2 + AB\gamma(L)\cos(\phi') \quad (1)$$

$$\phi' = 2kL = 2\pi M + \phi$$

where A is the amplitude value of reference light, B is the amplitude value of test light, $\gamma(L)$ is the coherence function, $\phi'$ is the phase of the interference signal, M is the order of interference, $\phi$ is the fractional component of the phase (to be referred to as a fractional phase) of the interference signal falling within the range of $\pm\pi$, and L is the absolute distance. Assume that the refractive index of the space is 1 and there is no dispersion for simplicity. The light sources IL1, IL2, and IL3 are VCSELs capable of oscillating in the single mode.

Because of a long coherence length, the coherence function $\gamma(L)$ comes close to 1 and a detectable interference signal is obtained as long as the absolute distance L is, for example, 1 m or less. For example, as reported in literature 1, the absolute distance L can be obtained from the peak frequency of the amplitude spectrum of the interference signal by performing fast Fourier transformation (FFT) for the interference signal S1. However, when the peak frequency is obtained by this method, a measurement accuracy of only up to about 1/100 of the pitch P of discrete data after FFT (to be referred to as a post-FFT pitch) can be attained. The post-FFT pitch is given by equation (2):

$$P = \frac{\pi}{(k_{12} - k_{11})} \quad (2)$$

Equation (2) represents that the wave number scanning range can be increased to decrease the post-FFT pitch, that is, improve the measurement accuracy. In literature 1, a wide wave number scanning range with a post-FFT pitch P of about 3 μm is implemented, but no wide measurement range can be achieved. In the use of wave number scanning by the VCSEL based on current modulation, the wave number scanning range of the VCSEL by current modulation is as narrow as about 2.1 mm$^{-1}$ (frequency of 100 GHz). Hence, only a narrow wave number scanning range with a post-FFT pitch P of about 1.5 mm can be obtained. The conventional technique attains only a measurement accuracy of 15 μm.

Figure 3:
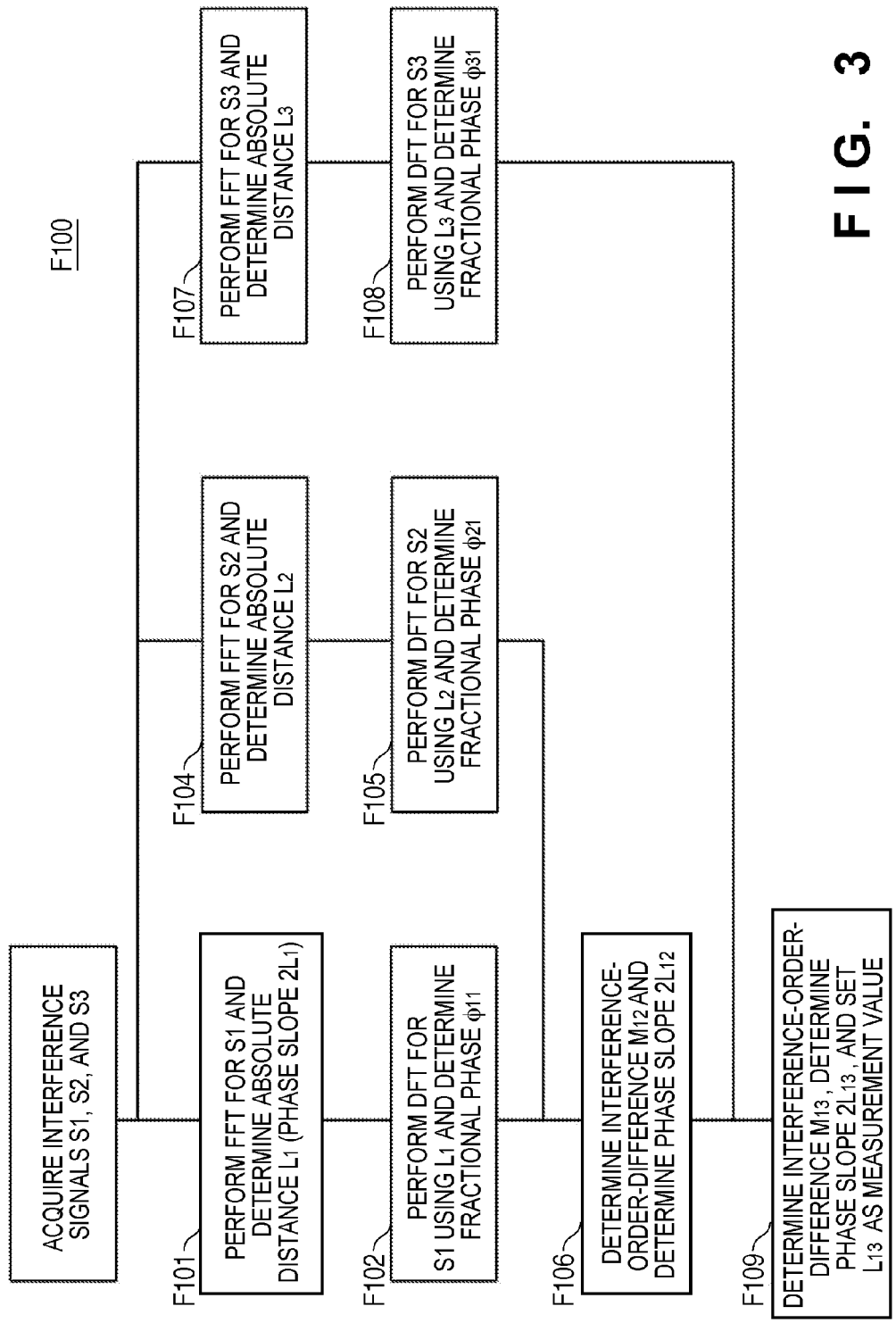
FIG. 3 is a flowchart schematically showing a processing sequence to determine the absolute distance from interference signals S1, S2, and S3 in the first embodiment.

Next, a method of determining the absolute distance from the interference signals S1, S2, and S3 with high accuracy in the measurement apparatus 100 according to the first embodiment will be explained. FIG. 3 schematically shows the sequence of processing (step F100) to determine the absolute distance from the interference signals S1, S2, and S3. The processor 107 executes this processing. FIG. 4A shows the intensity of the interference signal S1 when the wave number k is plotted along the abscissa. FIG. 4B shows the phase $\phi'$ of the first interference signal S1. Since the wave number k is a relative value, the phase $\phi'$ is determined using a phase at the wave number $k_{11}$ as a reference. An interference signal directly detected in the measurement apparatus 100 is a signal intensity as in FIG. 4A. The phase of the interference signal is therefore determined based on the signal intensity using fast Fourier transformation (FFT) and discrete Fourier transformation (DFT) as follows.

First, in step F101, the peak frequency in the amplitude spectrum is determined by performing FFT for the first interference signal S1, and an absolute distance $L_1$ is determined from the peak frequency. As represented by equation (1), double ($2L_1$) the obtained absolute distance $L_1$ corresponds to the slope of the phase $\phi'$ of the first interference signal S1 with respect to the wave number k shown in FIG. 4B.

Then, in step F102, the fractional phase $\phi$ of the first interference signal S1 at an arbitrary wave number k is determined by performing DFT for the first interference signal S1 using the absolute distance L. The fractional phase $\phi$ is calculated in accordance with equation (3):

$$\phi(k) = \tan^{-1}\frac{\sum_j S1(j)\sin\{2L_1(j-k)\}}{\sum_j S1(j)\cos\{2L_1(j-k)\}} \quad (3)$$

By equation (3), the fractional phase (fractional component of the first phase) of the first interference signal S1 at an arbitrary wave number such as a fractional phase $\phi_{11}$ at the wave number $k_{11}$ or a fractional phase $\phi_{12}$ at the wave number $k_{12}$ can be determined. The fractional phase $\phi$ can be determined by equation (3) only within the range of $\pm\pi$, and the order of interference is unknown. Since the slope of the phase $\phi'$ of the interference signal S1 has already been obtained as $2L_1$, the phase $\phi'$ can be represented as in FIG. 4B using the fractional phase $\phi_{11}$ at the wave number $k_{11}$ as a reference. In the following description, a phase without a prime ('), like the fractional phase $\phi_{11}$, falls within the range of $\pm\pi$, and a phase with a prime ('), like $\phi_{11}'$, is a relative phase using $\phi_{11}$ as a reference. The phase $\phi'$ is determined using the fractional phase $\phi_{11}$ at the wave number $k_{11}$ as a reference, but may be determined using a phase at an arbitrary wave number as a reference.

The absolute distance $L_1$ obtained by FFT in step F101 has an error with respect to the true value of the absolute distance. For example, by using the signal processing technique reported in literature 1 or performing appropriate zero padding in FFT, the accuracy of the absolute distance $L_1$ becomes about 1/100 of the post-FFT pitch obtained by equation (1), that is, 15 µm. The slope of the phase of the interference signal S1 at the wave number k is $2L_1$. When the absolute distance calculation accuracy is 1/100 of the post-FFT pitch, the accuracy of the fractional phase $\phi$ calculated in accordance with equation (3) becomes equal to or lower than $2\pi/100$ in the entire wave number scanning range. The conventional absolute distance determination method has only a step corresponding to step F101, that is, a step of obtaining the absolute distance (slope of the phase) by FFT. By adding step F102, like the first embodiment, not only the slope of the phase but also a fractional phase at an arbitrary wave number can be obtained based on one interference signal for the wave number k.

In steps F104 and F105, the absolute distance and fractional phase are determined by the same methods as those in steps F101 and F102. More specifically, in step F104, an absolute distance $L_2$ is determined based on the second interference signal S2. In step F105, a fractional phase (fractional component of the second phase) at an arbitrary wave number within the range of wave numbers $k_{21}$ to $k_{22}$ is determined based on the absolute distance $L_2$. The following description assumes that a fractional phase $\phi_{21}$ at the wave number $k_{21}$ is determined as the fractional phase of the second interference signal S2.

Figure 5:
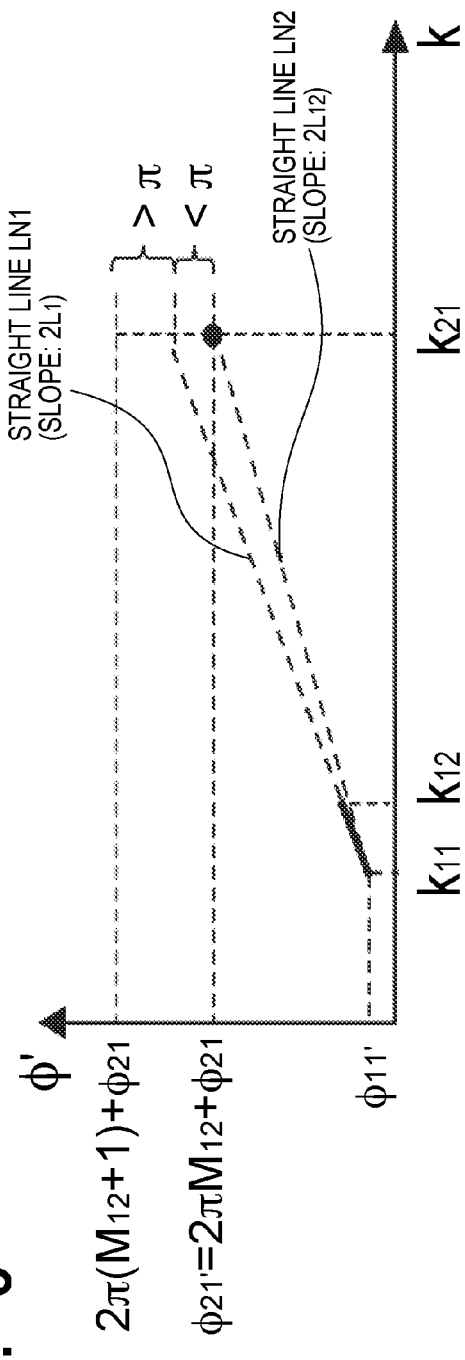
FIG. 5 is a graph exemplifying a method of calculating the slope of the phase.

A method of determining a slope $2L_{12}$ of the phase in step F106 will be explained with reference to FIG. 5. A straight line LN1 is determined by the phase $\phi_{11}$ of the interference signal S1 at the wave number $k_{11}$ and the slope $2L_1$ of the phase that have been determined in steps F101 and F102. A straight line LN2 is determined by phases $\phi_{21}'$ and $\phi_{11}'$ represented by ($2\pi M_{12}+\phi_{21}$). $M_{12}$ is the difference (first interference-order-difference) between the order of interference of the interference signal S1 at the wave number $k_{11}$ and the order of interference of the interference signal S2 at the wave number $k_{21}$. $M_{12}$ can be determined by equation (4):

$$M_{12} = \text{round}\left\{\frac{2L_1(k_{21} - k_{11}) + \phi_{11} - \phi_{21}}{2\pi}\right\} \quad (4)$$

where "round( )" is the function of rounding an argument to an integer. To determine $M_{12}$ accurately, inequality (5) needs to be satisfied:

$$\frac{\delta\phi(k_{12} - k_{11})}{(k_{12} - k_{11})} < \pi \quad (5)$$

where $\delta\phi$ is the phase error. As described above, when the phase error $\delta\phi$ is set smaller than $2\pi/100$, ($k_{21}-k_{11}$) needs to be 50 times or less of ($k_{12}-k_{11}$), as represented by inequality (5). To obtain the maximum effect, ($k_{21}-k_{11}$) is set to be 50 times of ($k_{12}-k_{11}$). As is apparent from inequality (5), the difference between $k_{21}$ and $k_{11}$, that is, the separation gap between the wavelength scanning ranges of IL1 and IL2 can be increased as the phase error $\delta\phi$ decreases. In step F105, the fractional phase $\phi_{21}$ is obtained. By determining the first interference-order-difference $M_{12}$ according to equation (4), an absolute distance $L_{12}$ can be determined from the slope of the straight line LN2, as represented by equation (6):

$$L_{12} = \frac{1}{2}\frac{\phi_{21}' - \phi_{11}'}{k_{21} - k_{11}} = \frac{1}{2}\frac{2\pi M_{12} + \phi_{21} - \phi_{11}}{k_{21} - k_{11}} \quad (6)$$

The absolute distance $L_{12}$ calculated according to equation (6) improves the accuracy (error) to 1/50 of the absolute distance $L_1$ calculated in step F101. This means that a phase in the wave number scanning range of $k_{11}$ to $k_{12}$ and that at the wave number $k_{21}$ can be connected by determining the first interference-order-difference $M_{12}$. The same absolute distance accuracy as that when the wave number scanning range of $k_{11}$ to $k_{21}$ is scanned can be obtained.

In steps F107 and F108, the absolute distance and fractional phase are determined by the same methods as those in steps F104 and F105. More specifically, in step F107, an absolute distance $L_3$ is determined based on the third interference signal S3. In step F108, a fractional phase (fractional component of the third phase) at an arbitrary wave number within the wavelength scanning range of wave numbers $k_{31}$ to $k_{32}$ is determined based on the absolute distance $L_3$ (step F108). The following description assumes that a fractional phase $\phi_{31}$ at the wave number $k_{31}$ is determined as the fractional phase of the third interference signal S3.

In step F109, a difference (second interference-order-difference) $M_{13}$ between the order of interference of the interference signal at the wave number $k_{11}$ and the order of interference of the interference signal at the wave number $k_{31}$ is determined by the same method as that in step F106. The interference-order-difference $M_{13}$ is defined by equation (7):

$$M_{13} = \text{round}\left\{\frac{2L_{12}(k_{31} - k_{11}) + \phi_{11} - \phi_{31}}{2\pi}\right\} \quad (7)$$

To obtain the second interference-order-difference $M_{13}$ accurately, inequalities (8) needs to be satisfied:

$$\frac{\delta\phi(k_{31}-k_{11})}{(k_{21}-k_{11})} < \pi \quad (8)$$

$$\frac{\delta\phi(k_{31}-k_{11})}{50(k_{12}-k_{11})} < \pi$$

Figure 6:
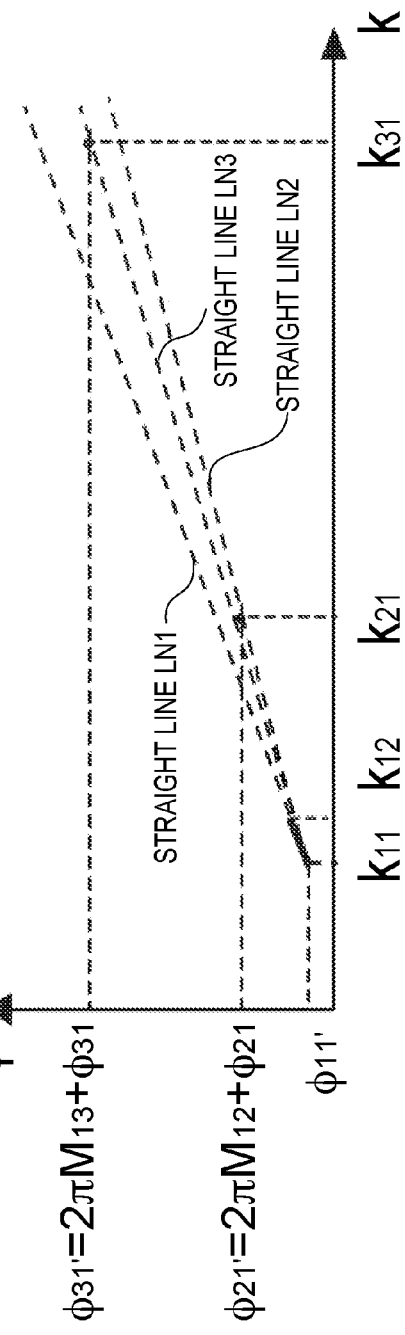
FIG. 6 is a graph exemplifying the method of calculating the slope of the phase.

By determining the interference-order-difference $M_{13}$, a straight line LN3 shown in FIG. 6 can be determined. Hence, the absolute distance $L_{13}$ can be calculated in accordance with equation (9):

$$L_{13} = \frac{1}{2}\frac{\phi'_{31}-\phi'_{11}}{k_{31}-k_{11}} = \frac{1}{2}\frac{2\pi M_{13}+\phi_{31}-\phi_{11}}{k_{31}-k_{11}} \quad (9)$$

From inequalities (8), $(k_{31}-k_{11})$ can be increased to a maximum of 50 times of $(k_{21}-k_{11})$, and $(k_{31}-k_{11})$ can be increased to a maximum of 2,500 times of $(k_{12}-k_{11})$. The absolute distance $L_{13}$ calculated according to equation (9) improves the accuracy to 1/50 of the absolute distance $L_{12}$ and 1/2500 of the absolute distance $L_1$. That is, the separation gap between the wave number scanning range of IL1 or IL2 and that of IL3 can become larger than that between the wave number scanning range of IL1 and that of IL2. The accuracy can exponentially increase depending on the number of wave number scanning ranges. Note that when the absolute distance is obtained using the conventional technique, for example, even when an increase in the accuracy is attempted by averaging or the like, only an effect by reproducibility improvement is obtained. When the number of wave number scanning ranges is N (N is an integer of 3 or more), the separation gap between the (i−1)th wavelength scanning range and the ith wavelength scanning range is preferably larger than that between the (i−2)th wavelength scanning range and the (i−1)th wavelength scanning range.

As described above, the measurement apparatus 100 according to the first embodiment can obtain the absolute distance between the reference surface 101 and the test surface 102 by a simple arrangement. At this time, each wavelength scanning range need not be widened. Thus, the absolute distance can be quickly obtained at high accuracy using wavelength scanning by the VCSEL based on current modulation.

The first embodiment employs three light sources (N=3), but the number of light sources may be increased or decreased in accordance with a necessary accuracy. The phase measurement accuracy is about $2\pi/100$. However, even if the phase measurement accuracy degrades to $2\pi/100$ or more due to the apparatus arrangement, the separation gap between the wavelength scanning ranges of respective light sources is decreased so that the phase measurement accuracy comes close to a degree at which the interference-order-difference can be determined. In this case, for example, $(k_{21}-k_{11})/(k_{12}-k_{11})$ becomes smaller than 50, but the measurement accuracy can be improved satisfactorily.

A case in which the number of wavelength scanning ranges is four or more, that is, N is an integer of 4 or more will be explained. Based on the ith interference signal detected by the interferometer unit 300 for the ith wavelength scanning range, the processor 107 determines the fractional component of the ith phase that is the phase of the ith interference signal at an arbitrary wave number falling within the ith wavelength scanning range. Based on the (i−1)th slope of the phase, the processor 107 determines the (i−1)th interference-order-difference serving as the difference between the order of interference of the first phase and the order of interference of the ith phase. Also, based on the (i−1)th interference-order-difference, the fractional component of the first phase, and the fractional component of the ith phase, the processor 107 determines the ith slope of the phase, that is the slope of the phase of an interference signal containing the first to ith interference signals with respect to the wave number of light. By repeating this processing while incrementing i one by one from i=3 to i=N, the processor 107 determines the slope of the Nth phase and determines the absolute distance from the Nth slope of the phase.

The first embodiment handles a wave number measurement error in the wave number measurement unit as a negligible one. However, when a non-negligible wavelength measurement error exists, the separation gap is similarly decreased to a degree at which the interference-order-difference can be determined. The separation gap between wavelength scanning ranges can also be adjusted depending on the test object or measurement environment. In this case, no quick adjustment is necessary, and the wavelength scanning range is adjusted by, for example, changing the temperature of each VCSEL.

In the first embodiment, the wave number measurement unit 200 including the Fabry-Perot etalon is used as a unit for measuring the wave number of the light source. However, when the wave number measurement accuracy is permissible, the present invention can also adopt a wave number measurement method of measuring in advance the relationship between a current to be supplied to the light source and a wave number and obtaining a wave number from the current value.

The slope of the phase of the interference signal and the fractional phase are determined using FFT and DFT in the first embodiment, but may be determined using another known method. For example, the present invention may employ a heterodyne phase detection method of giving a frequency difference to reference light and test light having different polarization states, or a homodyne detection method using a plurality of interference signals to which a known phase difference is given. In this case, however, the apparatus arrangement becomes slightly complicated because, for example, the number of detectors needs to be increased. To hold the polarization state or phase difference, new restrictions are imposed on the apparatus arrangement such that no optical fiber can be used in a specific optical path.

The first embodiment uses FFT to determine the slope of the interference phase. However, another known frequency analysis method such as a maximum entropy method is also available.

The first embodiment employs an arrangement in which wavelength scanning is performed simultaneously in respective wavelength scanning ranges, and light is split by the wavelength filters 105a, 105b, 105c, and 105d, and then received by the detectors. Alternatively, wavelength scanning may be executed sequentially in respective wavelength scanning ranges. In this case, the measurement speed drops, but the spectral element can be omitted and a common detector can be used for light beams in the respective wavelength scanning ranges, further simplifying the arrangement.

Figure 7:
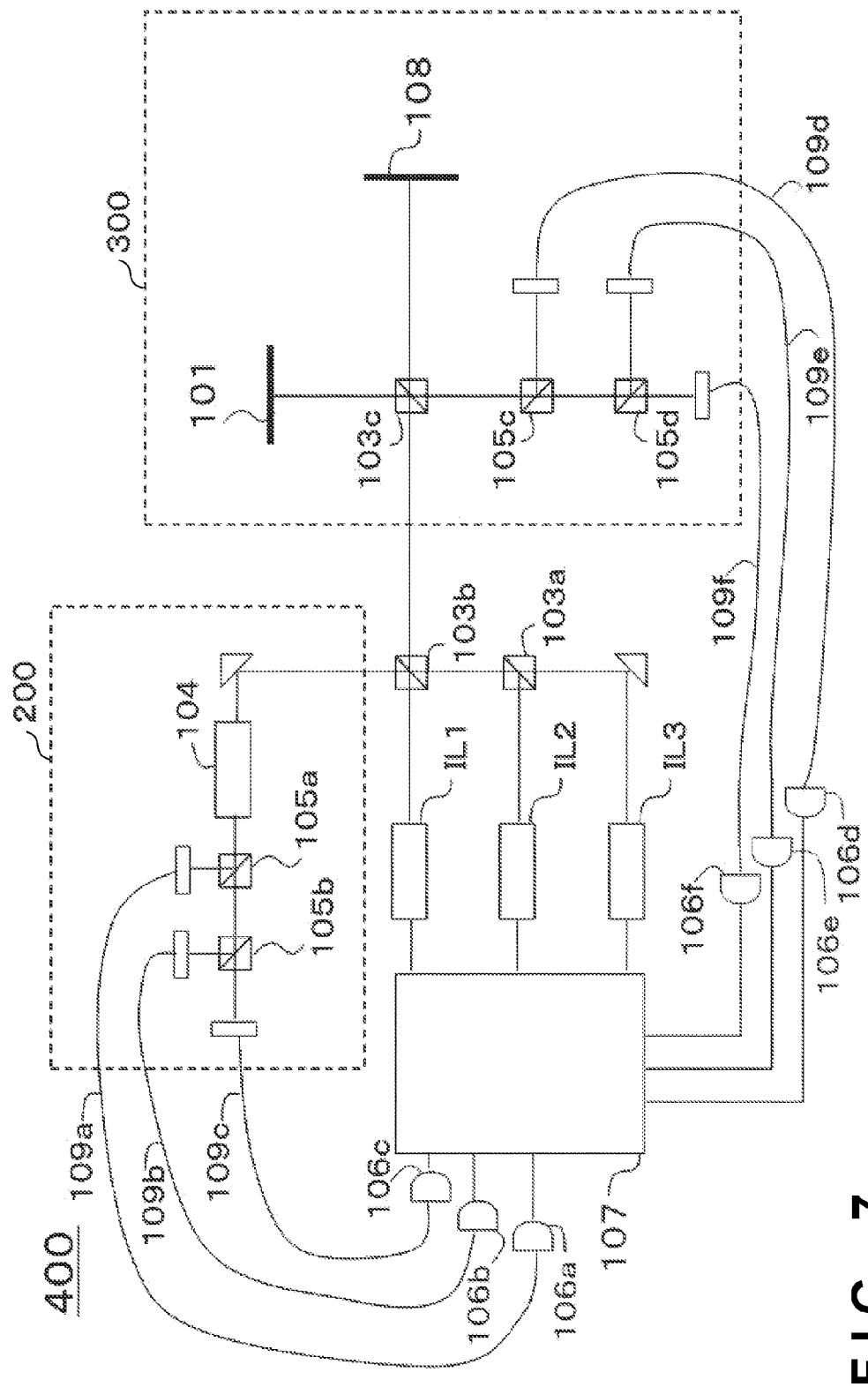
FIG. 7 is a view showing the schematic arrangement of a measurement apparatus (wavelength scanning interferometer) according to the second embodiment.

The arrangement of a measurement apparatus (wavelength scanning interferometer) 400 according to the second embodiment of the present invention will be described with reference to FIG. 7. The measurement apparatus 400 basically has the same arrangement as that of the measurement apparatus 100. However, the measurement apparatus 400 adopts the following arrangement to measure the absolute distance in a wider range at higher accuracy. First, the measurement apparatus 400 uses a DFB laser as a light source instead of the VCSEL laser. A general DFB laser has a coherence length of more than 1 m which is larger than that of the VCSEL laser, and can obtain a satisfactory interference signal even when measuring a wide range of 5 m or less. In the measurement apparatus 400, detectors 106a, 106b, and 106c are arranged outside the housing of a wave number measurement unit 200. The housing and the detectors 106a, 106b, and 106c are connected by optical fibers 109a, 109b, and 109c. Also in the measurement apparatus 400, detectors 106d, 106e, and 106f for detecting interference signals S1, S2, and S3 are arranged outside the housing of an interferometer unit 300. The housing and the detectors 106d, 106e, and 106f are connected by optical fibers 109d, 109e, and 109f. This prevents the temperature environments of the wave number measurement unit 200 and interferometer unit 300 from becoming instable owing to heat generated when each detector operates.

The wave number measurement unit 200 measures the relative value of a wave number to be scanned in the first embodiment, but measures the absolute value of the wave number in the second embodiment. In the wave number measurement unit 200, an etalon and gas cell may be combined to obtain a higher-accuracy wave number measurement value. The second embodiment can determine the absolute distance at higher accuracy than in the first embodiment in step F200 (to be described later) by measuring the absolute value of the wave number by the wave number measurement unit 200.

In the measurement apparatus 400 of the second embodiment, a test surface 108 is preferably a mirror surface. Measurement of the absolute distance of the mirror surface often requires higher measurement accuracy, compared to a test surface which backscatters light. Considering measurement of the absolute distance in a wide range, the use of backscattered light can decrease the quantity of test light. However, the quantity of test light can be satisfactorily ensured using specular reflection light from the mirror surface as test light.

Figure 8:
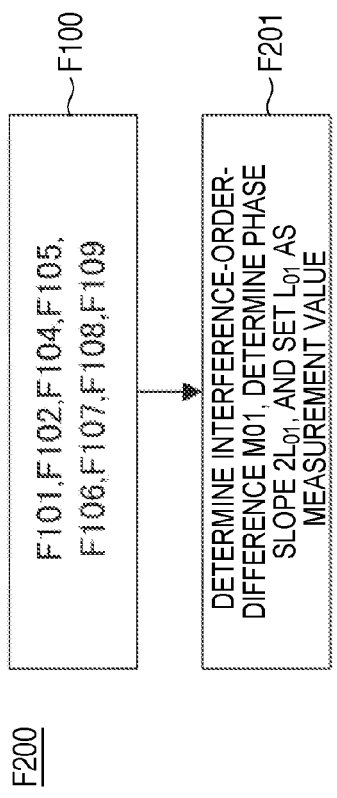
FIG. 8 is a flowchart schematically showing a processing sequence to determine the absolute distance from interference signals S1, S2, and S3 in the second embodiment.

FIG. 8 schematically shows the sequence of processing (step F200) to determine the absolute distance from the interference signals S1, S2, and S3 in the measurement apparatus 400. Step F200 includes step F100 in the first embodiment, and subsequent step F201. In step F201, an order $M_{01}$ of interference of a phase $\phi_{11}'$ is determined based on a slope $2L_{13}$ of the phase determined in step F100, an arbitrary wave number ($k_{11}$ in this case) falling within one of a plurality of wave number scanning ranges, and a fractional phase $\phi_{11}$ at the wave number $k_{11}$. Further in step F201, an absolute distance $L_{01}$ is determined based on the determined order $M_{01}$ of interference and the fractional phase $\phi_{11}$.

Figure 9:
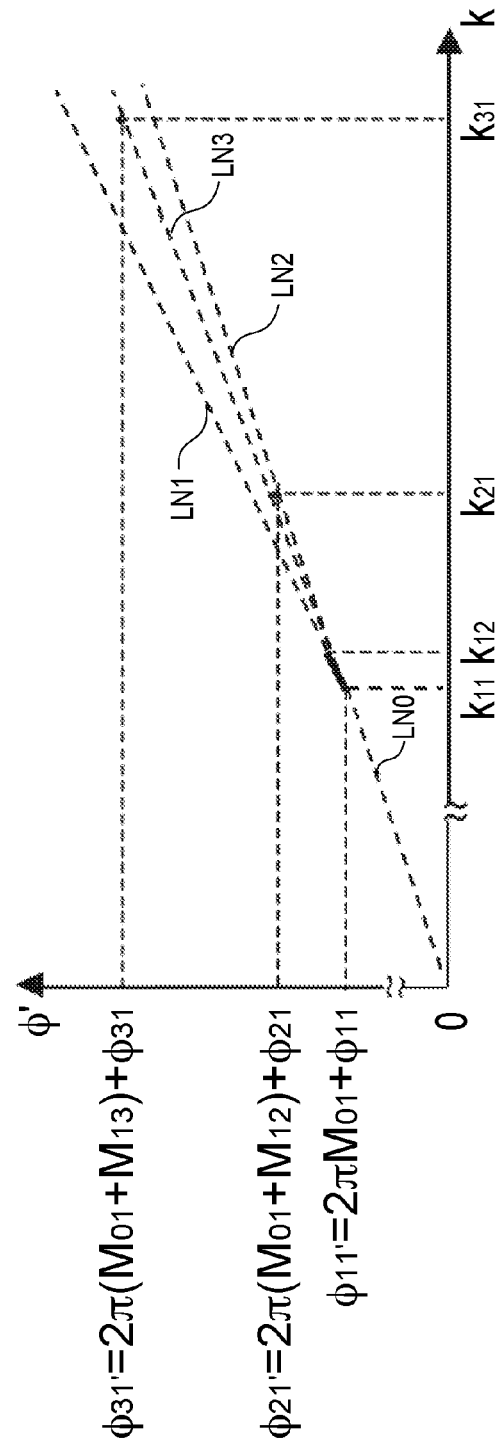
FIG. 9 is a graph exemplifying a method of calculating the slope of the phase.

Step F201 will be explained with reference to FIG. 9. FIG. 9 shows a straight line LN0 in addition to straight lines LN1, LN2, and LN3 determined in step F100. In the first embodiment, $\phi'$ is obtained by connecting respective fractional phases $\phi$ using the fractional phase $\phi_{11}$ as a reference. In the second embodiment, the phase $\phi'$ is connected as $\phi_{11}'=2\pi M_{01}+\phi_{11}$ using the order $M_{01}$ of interference at $k_{11}$. This is equivalent to connecting the phase $\phi'$ using the phase $\phi_0=0$ at a wave number $k_0=0$. Considering that the order of interference at $k_0$ is 0, it can be understood that the order $M_{01}$ of interference is also the difference between the order of interference of an interference signal at $k_{11}$ and the order of interference of an interference signal at $k_0$. In step F201, as in step F106, the order $M_{01}$ of interference at the wave number $k_{11}$ can be determined in accordance with equation (10):

$$M_{01} = \text{round}\left\{\frac{2L_{13}k_{11} + \phi_{11}}{2\pi}\right\} \quad (10)$$

At this time, to determine the order $M_{01}$ of interference accurately, inequality (11) needs to be satisfied:

$$\frac{\delta\phi k_{11}}{(k_{31} - k_{11})} < \pi \quad (11)$$

In addition, the absolute value of the wave number $k_{11}$ needs to be obtained. By determining the order $M_{01}$ of interference, the straight line LN0 shown in FIG. 9 can be determined. Thus, the absolute distance $L_{01}$ can be obtained according to equation (12):

$$L_{01} = \frac{1}{2}\frac{\phi_{11}'}{k_{11}} = \frac{1}{2}\frac{2\pi M_{01} + \phi_{11}}{k_{11}} \quad (12)$$

The absolute distance $L_{01}$ calculated according to equation (12) improves the accuracy to $\{(k_{31}-k_{11})/k_{11}\}$ with respect to the absolute distance in the first embodiment. The accuracy of the absolute distance $L_{01}$ is $\frac{1}{2}\cdot\delta/k_{11}$. When an inexpensive DFB laser for a 1.5 μm-band communication device is used and the wave number $k_{11}=4.2$ μm$^{-1}$, an accuracy of 7.5 nm is obtained.

As described above, in step F200 of the second embodiment, the absolute distance can be obtained from the interference signals S1, S2, and S3 at high accuracy. In addition to step F100, the absolute wave number is obtained to determine the order of interference in step F200. The absolute distance can be measured at higher accuracy.

Similar to the measurement apparatus 100 of the first embodiment, the measurement apparatus 400 of the second embodiment can also adjust the separation gap between wavelength scanning ranges depending on the test object or measurement environment. In this case, it is considered that no quick adjustment is necessary, so the wavelength scanning range is adjusted by, for example, changing the temperature of each DFB laser.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-251278, filed Nov. 9, 2010, which is hereby incorporated by reference herein in its entirety.

What is claimed is:

1. A measurement apparatus which measures a distance between a reference surface and a test surface, the apparatus comprising:
   a light source unit including a plurality of light sources each corresponding to one of a plurality of wavelength scanning ranges which are separate from each other and each continuously scans a wavelength of generated light in the corresponding wavelength scanning range of the plurality of wavelength scanning ranges;
   an interferometer unit which splits light emitted by each of the plurality of light sources into reference light and test light, and detects, as an interference signal, an interference fringe formed by the reference light reflected by the reference surface and the test light reflected by the test surface; and a processor which determines a slope of a phase of the interference signal with respect to wave number of the light based on the interference signal detected by the interferometer unit for each of the plurality of wavelength scanning ranges, and determines the distance from the slope of the phase, wherein the light source unit simultaneously scan the plurality of wavelength scanning ranges, and the interferometer unit simultaneously detects the interference fringes each formed by the light from the corresponding light source of the plurality of light sources, wherein the processor determines, based on a first interference signal detected by the interferometer unit for a first wavelength scanning range that is one of the plurality of wavelength scanning ranges, a first slope of a phase, that is a slope of a phase of the first interference signal with respect to wave number within the first wavelength scanning range, and a fractional component of a first phase that is a phase of the first interference signal at an arbitrary wave number falling within the first wavelength scanning range, determines, based on a second interference signal detected by the interferometer unit for a second wavelength scanning range that is another one of the plurality of wavelength scanning ranges, a fractional component of a second phase that is a phase of the second interference signal at an arbitrary wave number falling within the second wavelength scanning range, determines, based on the first slope of the phase, the fractional component of the first phase, and the fractional component of the second phase, a first interference-order-difference that is a difference between order of interference of the first phase and order of interference of the second phase, and determines, as an updated slope of a phase for determining the distance, based on the first interference-order-difference, the fractional component of the first phase, and the fractional component of the second phase, a second slope of a phase, that is a slope of a phase of an interference signal, containing the first interference signal and the second interference signal, with respect to wave number.

2. The apparatus according to claim 1, wherein the processor determines the slope of the phase of the first interference signal by performing frequency analysis for the first interference signal, and obtains the first phase by performing discrete Fourier transform for the first interference signal using the slope of the phase of the first interference signal.

3. The apparatus according to claim 1, wherein
the number of wavelength scanning ranges is three, and
the processor further determines, based on a third interference signal detected by the interferometer unit for a third wavelength scanning range, a fractional component of a third phase that is a phase of the third interference signal at an arbitrary wave number falling within the third wavelength scanning range, determines, based on the slope of the second phase, a second interference-order-difference that is a difference between order of interference of the first phase and order of interference of the third phase, determines, based on the second interference-order-difference, the fractional component of the first phase, and the fractional component of the third phase, a third slope of a phase, that is a slope of a phase of an interference signal, containing the first interference signal up to the third interference signal, with respect to wave number, and determines the distance from the third slope of the phase.

4. The apparatus according to claim 1, wherein
the number of wavelength scanning ranges is N, wherein N is an integer of not less than 4,
the processor determines an Nth slope of a phase by, while incrementing i one by one from i=3 to i=N, repeating processing of
determining, based on an (i−1)th interference signal detected by the interferometer unit for an ith wavelength scanning range, a fractional component of an ith phase that is a phase of an ith interference signal at an arbitrary wave number falling within the ith wavelength scanning range,
determining, based on an (i−1)th slope of a phase, an (i−1)th interference-order-difference that is a difference between order of interference of the first phase and order of interference of the ith phase, and
determining, based on the (i−1)th interference-order-difference, the fractional component of the first phase, and the fractional component of the ith phase, an ith slope of a phase, that is a slope of a phase of an interference signal, containing the first interference signal up to the ith interference signal, with respect to wave number, and
the processor determines the distance from the Nth slope of the phase.

5. The apparatus according to claim 4, wherein a separation gap between an (i−1)th wavelength scanning range and an ith wavelength scanning range is larger than a separation gap between an (i−2)th wavelength scanning range and the (i−1)th wavelength scanning range.

6. The apparatus according to claim 1, wherein the processor determines the distance based on order of interference of an interference signal and a fractional component of a phase at an arbitrary wave number falling within a wavelength scanning range out of the plurality of wavelength scanning ranges.

7. The apparatus according to claim 1, wherein
the interferometer unit includes a plurality of detectors which simultaneously detect a plurality of interference fringes formed by the lights from the plurality of light sources.

* * * * *